(12) United States Patent
Daigle

(10) Patent No.: US 7,017,417 B2
(45) Date of Patent: Mar. 28, 2006

(54) PRESSURE SENSOR ASSEMBLY SUITABLE FOR USE IN HARSH ENVIRONMENTS

(75) Inventor: Guy A. Daigle, Plainville, CT (US)

(73) Assignee: Weatherford/Lamb, Inc., Houston, TX (US)

( * ) Notice: Subject to any disclaimer, the term of this patent is extended or adjusted under 35 U.S.C. 154(b) by 24 days.

(21) Appl. No.: 10/775,273

(22) Filed: Feb. 10, 2004

(65) Prior Publication Data

US 2005/0172721 A1    Aug. 11, 2005

(51) Int. Cl.
*G01L 9/00* (2006.01)
(52) U.S. Cl. ........................................................ 73/705
(58) Field of Classification Search ................. 73/700, 73/705, 706; 250/227.14, 227.18, 227.19
See application file for complete search history.

(56) References Cited

U.S. PATENT DOCUMENTS

| | | | |
|---|---|---|---|
| 6,422,084 B1 * | 7/2002 | Fernald et al. ................ 73/705 |
| 6,439,055 B1 * | 8/2002 | Maron et al. .................. 73/705 |
| 6,612,174 B1 * | 9/2003 | Sittler et al. ................... 73/705 |
| 6,668,656 B1 * | 12/2003 | Fernald et al. ................ 73/705 |
| 6,820,489 B1 * | 11/2004 | Fernald et al. ................ 73/705 |
| 2002/0154860 A1 * | 10/2002 | Fernald et al. ................ 385/37 |
| 2002/0194917 A1 * | 12/2002 | Fernald et al. ................ 73/705 |
| 2004/0129083 A1 * | 7/2004 | Fernald et al. ................ 73/705 |

* cited by examiner

*Primary Examiner*—Edward Lefkowitz
*Assistant Examiner*—Andre Allen
(74) *Attorney, Agent, or Firm*—Patterson & Sheridan, L.L.P.

(57) ABSTRACT

A sensor for sensing the pressure of a first fluid is provided. In one embodiment, sensor for sensing the pressure of a first fluid includes a fiber optic based sensing element disposed in a housing. A buffer fluid is disposed in the housing and is in fluid communication with the sensing element. A pressure transmitter is coupled to the housing for maintaining a predefined relationship between pressures of the first fluid and buffer fluid. A connector assembly is coupled to the housing and is coupled by an optical fiber is the sensing element. The sensor having a connector assembly is suitable for use in harsh conditions, such as within oil and gas well applications.

25 Claims, 12 Drawing Sheets

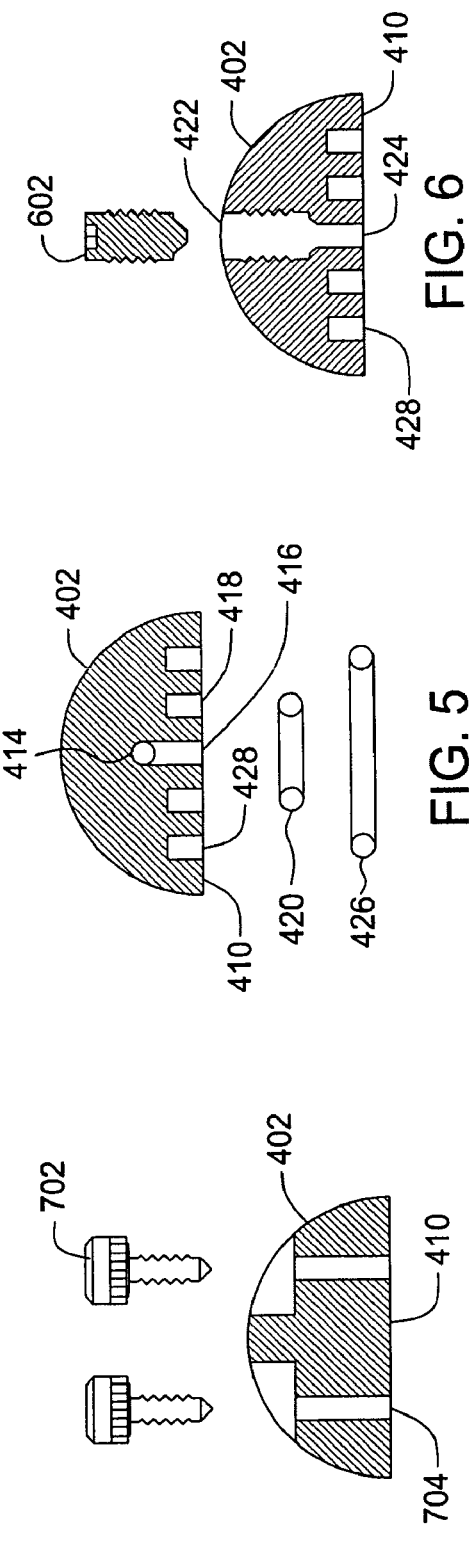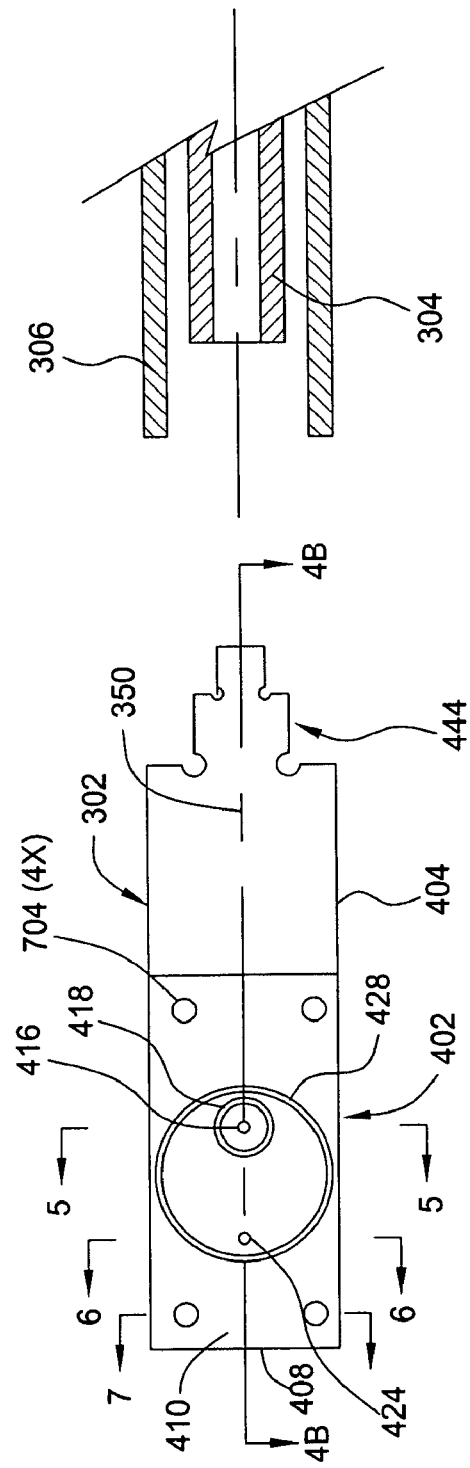

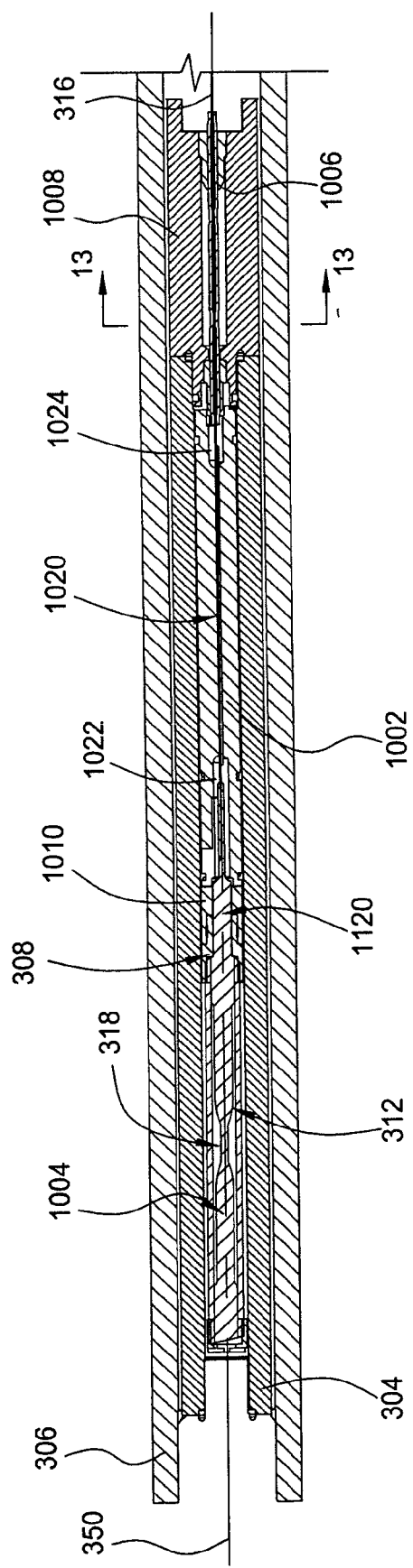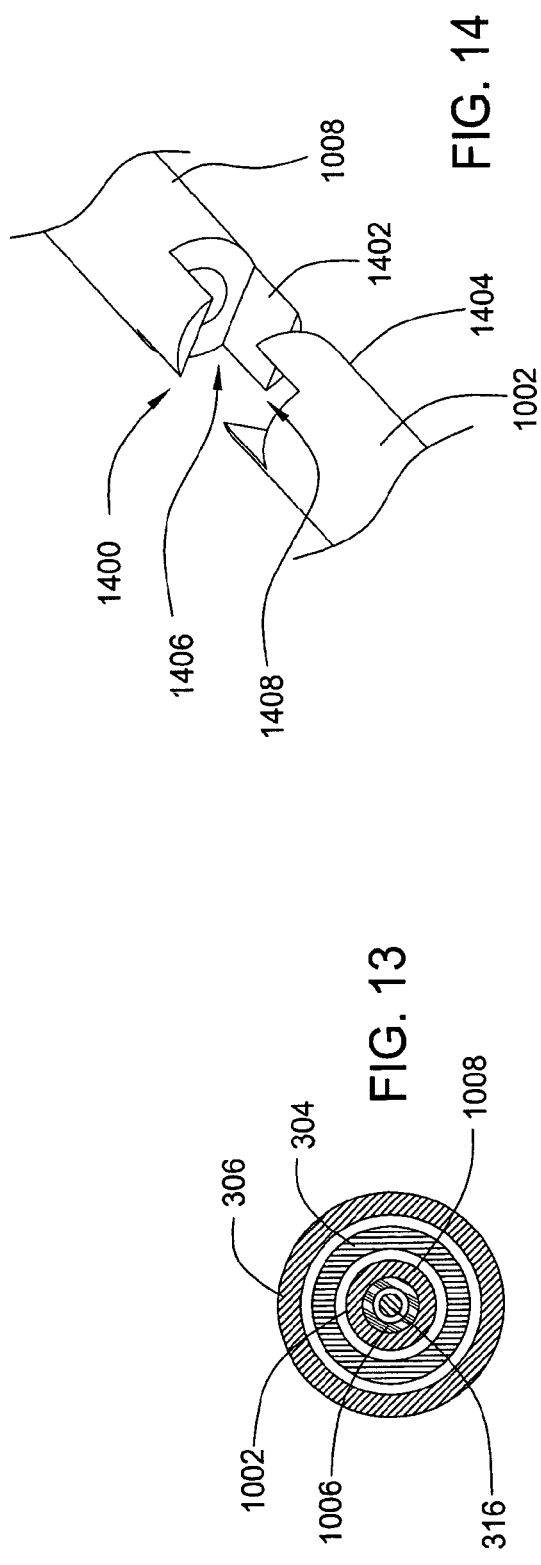

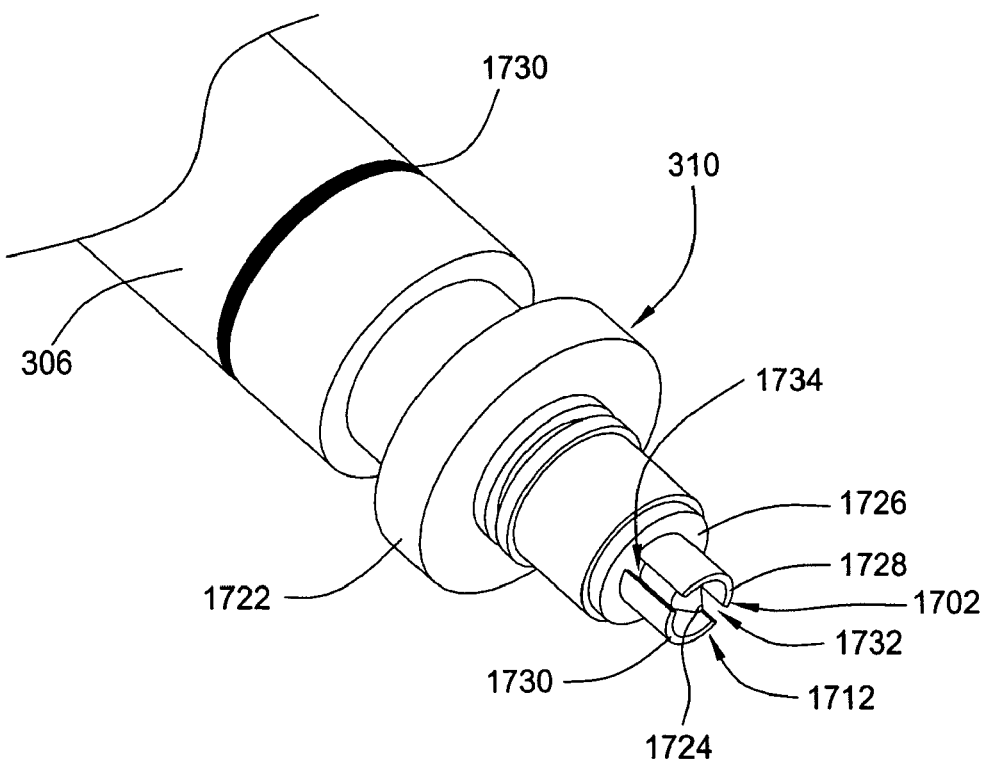
FIG. 18
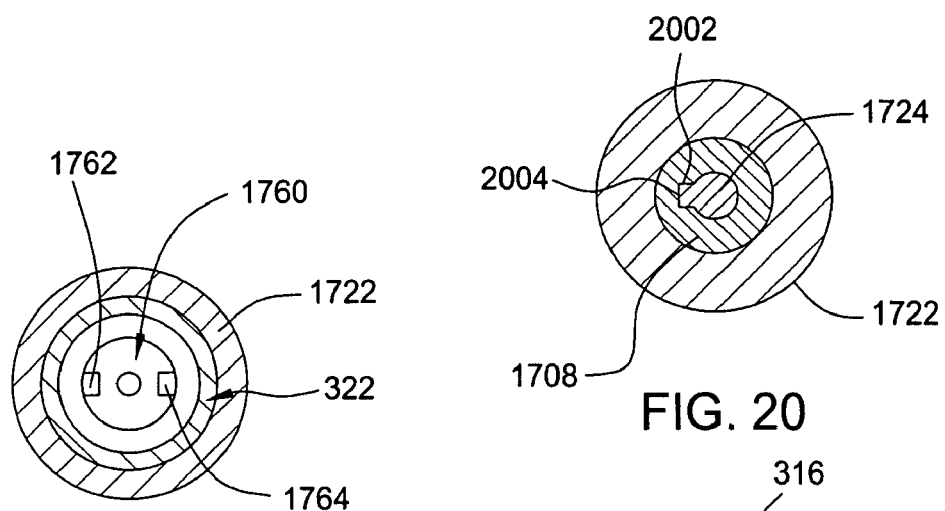
FIG. 19
FIG. 20
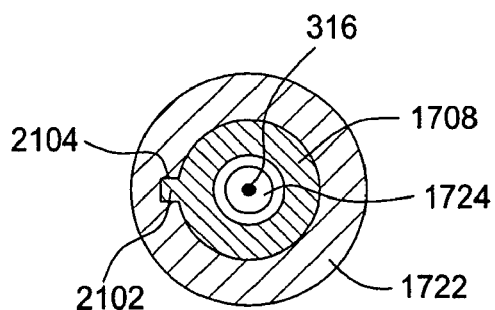
FIG. 21

PRESSURE SENSOR ASSEMBLY SUITABLE FOR USE IN HARSH ENVIRONMENTS

BACKGROUND OF THE INVENTION

1. Field of the Invention

Embodiments of the invention generally relate to pressure sensors, and more specifically, to pressure sensors suitable for use in harsh environments.

2. Background of the Related Art

Sensors for the measurement of various physical parameters such as pressure and temperature often rely on the transmission of strain from an elastic structure (e.g., a diaphragm, bellows, etc.) to a sensing element. In a pressure sensor, the sensing element may be bonded to the elastic structure with a suitable adhesive.

It is also known that the attachment of the sensing element to the elastic structure can be a large source of error if the attachment is not highly stable. In the case of sensors that measure static or very slowly changing parameters, the long term stability of the attachment to the structure is extremely important. A major source of such long term sensor instability is a phenomenon known as "creep", i.e., change in strain on the sensing element with no change in applied load on the elastic structure, which results in a DC shift or drift error in the sensor signal. It is further known that most attachments transmit a base strain to the sensor through the attachment structure and that a true zero base strain sensitivity is difficult if not impossible to achieve.

One example of a fiber optic based sensor is that described in U.S. patent application Ser. No. 9/205,944, entitled "Tube-Encased Fiber Grating Pressure Sensor", to T. J. Bailey et al., which is incorporated herein by reference in its entirety. Bailey et al. describes an optical fiber based sensor encased within a tube and discloses certain embodiments wherein the sensor is suspended within a fluid. Some examples of such fiber optic sensors include sensors and tubes that are comprised of glass. A disadvantage of such sensors is that the glass is fragile, being brittle and sensitive to cracking. Thus the use of such a sensor in a harsh environment, e.g. where the sensor would be subject to significant levels of shock and vibration, presents a serious threat of damage to the fragile sensor. In certain environments such sensors are subject to shock levels in excess of 100 times the force of gravity (g) and vibration levels of 5 g RMS at frequencies typically ranging from about 10 Hz to about 200 Hz.

However, as discussed hereinbefore, sensor performance is closely tied to attachment techniques and to packaging of the sensor element as well. It is important to package such sensor elements to protect the fragile elements and not impede performance of the sensor in a manner that is reliable and inexpensive to manufacture.

An improved pressure sensor is described in U.S. Pat. No. 6,439,055, issued Aug. 27, 2002, which is hereby incorporated by reference. The pressure sensor generally includes a fiber optic sensing element suspended within a fluid-filled housing. The fluid within the housing maintains the sensing element in a near-zero base strain condition and further protects the sensing element from shock and vibration. Fluid within the housing is coupled by a pressure transmitting device to a fluid surrounding the housing. The pressure transmitting device allows the fiber optic sensing element to provide a metric indicative of the pressure of the fluid surrounding the sensor while maintaining the fluid within the housing in a void free condition. This sensor has demonstrated reliable service in harsh conditions, such as within the well bore of oil and gas wells.

Although this sensor has proven to be a robust and reliable sensing instrument, the overall length of the sensor requires a correspondingly long mandrel which supports the sensor in the well bore of an oil well. As the mandrel has a very high cost-per-unit length relative to a conventional well bore tube section, the length of the sensor (about 28 inches) requires a relatively high cost mandrel. Moreover, as the sensor described in U.S. Pat. No. 6,439,055 is spliced to an optical fiber for communication with surface instruments, the pre-assembly and installation cost of this sensor are undesirably high.

Therefore, there is a need for an improved pressure sensor suitable for use in harsh environments.

SUMMARY OF THE INVENTION

A sensor for sensing the pressure of a first fluid is provided. In one embodiment, sensor for sensing the pressure of a first fluid includes a fiber optic based sensing element disposed in a housing. A buffer fluid is disposed in the housing and is in fluid communication with the sensing element. A pressure transmitter is coupled to the housing for maintaining a predefined relationship between pressures of the first fluid and buffer fluid. A connector assembly is coupled to the housing and is coupled by an optical fiber to the sensing element. The sensor having a connector assembly is suitable for use in harsh conditions, such as within oil and gas well applications.

BRIEF DESCRIPTION OF THE DRAWINGS

A more particular description of the invention, briefly summarized above, may be had by reference to the embodiments thereof that are illustrated in the appended drawings. It is to be noted, however, that the appended drawings illustrate only typical embodiments of this invention and are therefore not to be considered limiting of its scope, for the invention may admit to other equally effective embodiments.

FIGS. 4A–4B are side and sectional views of one embodiment of a pressure transmitter assembly;

FIG. 5 is a sectional view of the pressure transmitter assembly taken along section line 5—5 of FIG. 4A;

FIG. 6 is a sectional view of the pressure transmitter assembly taken along section line 6—6 of FIG. 4A;

FIG. 7 is a sectional view of the pressure transmitter assembly taken along section line 7—7 of FIG. 4A;

FIG. 10 is one embodiment of a transducer assembly;

FIGS. 13–14 are sectional and perspective views of a guide and a sensor assembly end cap of the transducer assembly;

FIG. 18 is a perspective view of a male connector end of the fiber optic connector assembly of FIG. 17;

FIG. 19 is a cross-sectional view of the male connector end of FIG. 18 taken along line 19—19;

FIG. 20 is a cross-sectional view of the male connector end of FIG. 18 taken along line 20—20;

FIG. 21 is a cross-sectional view of the male connector end of FIG. 18 taken along line 21—21.

To facilitate understanding, identical reference numerals have been used, wherever possible, to designate identical elements that are common to the figures.

DETAILED DESCRIPTION

Figure 1:
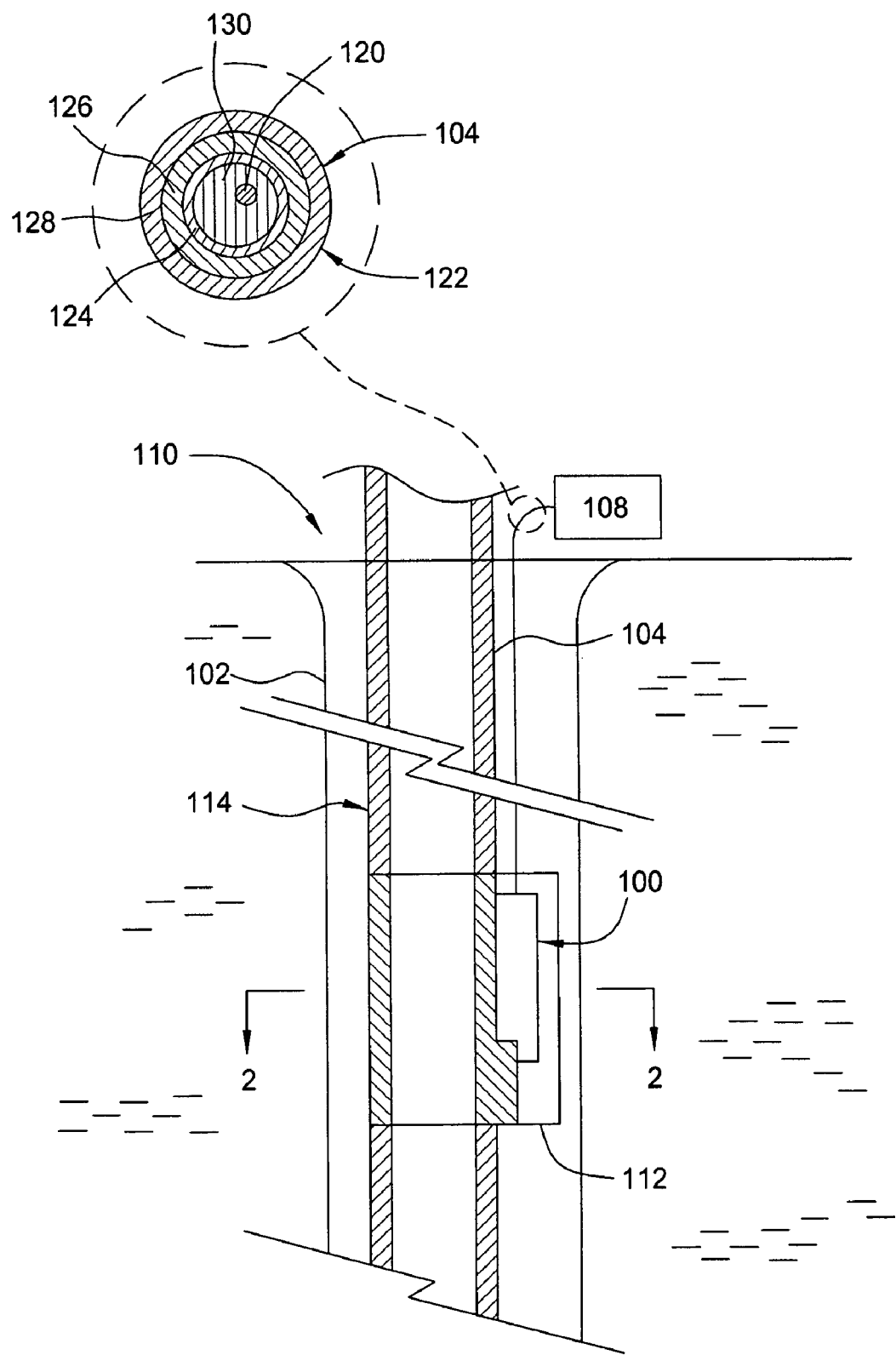
FIG. 1 is a simplified schematic of one embodiment of a pressure sensor disposed in an oil or gas well.

FIG. 1 is a simplified sectional view of an oil and/or gas well 110 having one embodiment of a pressure sensor 100 of the present invention disposed down the bore 102 of the well 110. The pressure sensor 100 is generally coupled by an optical cable 104 to a controller 108. The controller 108 is suitable for generating an optical signal transmitted through the cable 104 to the sensor 100 and resolving optical data reflected back through the cable 104 from the sensor 100. As is known, information from the transmitted and reflected signals may be utilized to determine pressure and/or other environmental information, such as shock, temperature, strain and the like, at the sensor 100. Suitable optical cables and controllers are available from Weatherford, Inc. located in Houston, Tex.

The optical cable 104 generally includes one or more optical fibers suitable for transmitting optical signals between the controller 108 and the sensor 100. Examples of suitable optical cables are described in U.S. Pat. No. 6,404,961, issued Jun. 11, 2002 to Bonja, et al., and U.S. patent application Ser. No. 10/422,396, filed Apr. 24, 2003 by Dowd, et al., both of which are hereby incorporated by reference in their entireties.

In the embodiment depicted in FIG. 1, the optical cable 104 includes one or more single-mode optical fibers 120 disposed in a protective sleeve 122 suitable to protect the optical fibers 120 in a down hole well environment. In some applications, the optical cable 104 may extend up to and exceed 12 kilometers through main bore 102 and/or at least one of the secondary bores (not shown) that may branch out from the main bore 102 within the well 110.

In one embodiment, the sleeve 122 includes an inner tube 124 seam welded around the one or more optical fibers 120, a spacer 126 and an outer metal tube 128. The inner tube 124 may be filled with a material 130, for example a getter gel, utilized to support the one or more optical fibers 120 in the inner tube 124. The outer metal tube 128 is welded around the spacer 126 that is disposed between the inner and outer tubes 124, 128. A barrier material (not shown) having low hydrogen permeability may be disposed on at least one of the tubes 124, 128.

The controller 108 is configured to transmit and receive optical signals through the optical cable 104. The controller 108 is suitable for interrogating Bragg grating based sensors to provide a metric indicative of the wavelength and/or frequency of reflected signals that are indicative of environmental conditions within the well, for example, pressure, temperature and strain. In addition, other environmental conditions may be detected by the optical Bragg grating based sensor such as pressure, seismic disturbances, chemicals, etc., as is well known in the art. It is also contemplated within the scope of present invention that multiple optical Bragg grating based sensors positioned along the cable may be multiplexed as is known in the art.

The sensor 100 is typically coupled to a mandrel 112 positioned in a column of bore tubing 114 at a predefined depth within the well 110. Although not shown in FIG. 1, the sensor 100 may be coupled to the mandrel 112 by any conventional means, such as banding, welding, fastening, and the like.

Figure 2:
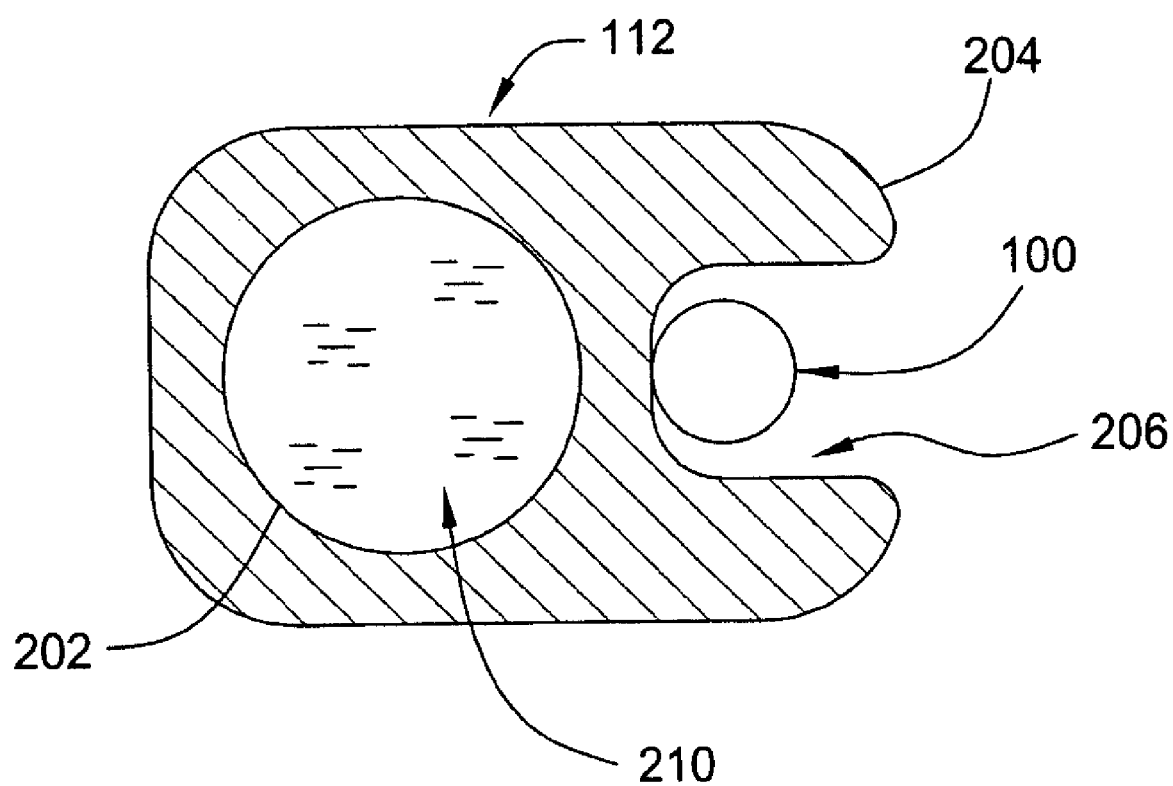
FIG. 2 is a sectional view of a well bore mandrel having the pressure sensor coupled thereto taken along section line 1—1 of FIG. 1.

FIG. 2 is a sectional view of the mandrel 112 taken along section line 2—2 of FIG. 1. The mandrel 112 generally includes an offset bore 202 that allows bore fluids 210, such as gas, oil, water and the like to communicate with the sensor 100. A side 204 of the mandrel 112 opposite the bore 202 includes a slot 206 configured to house the sensor 100. The slot 206 is generally configured to house below the outer circumference of the mandrel 112 to protect the sensor 100 within the well 110.

Figure 3:
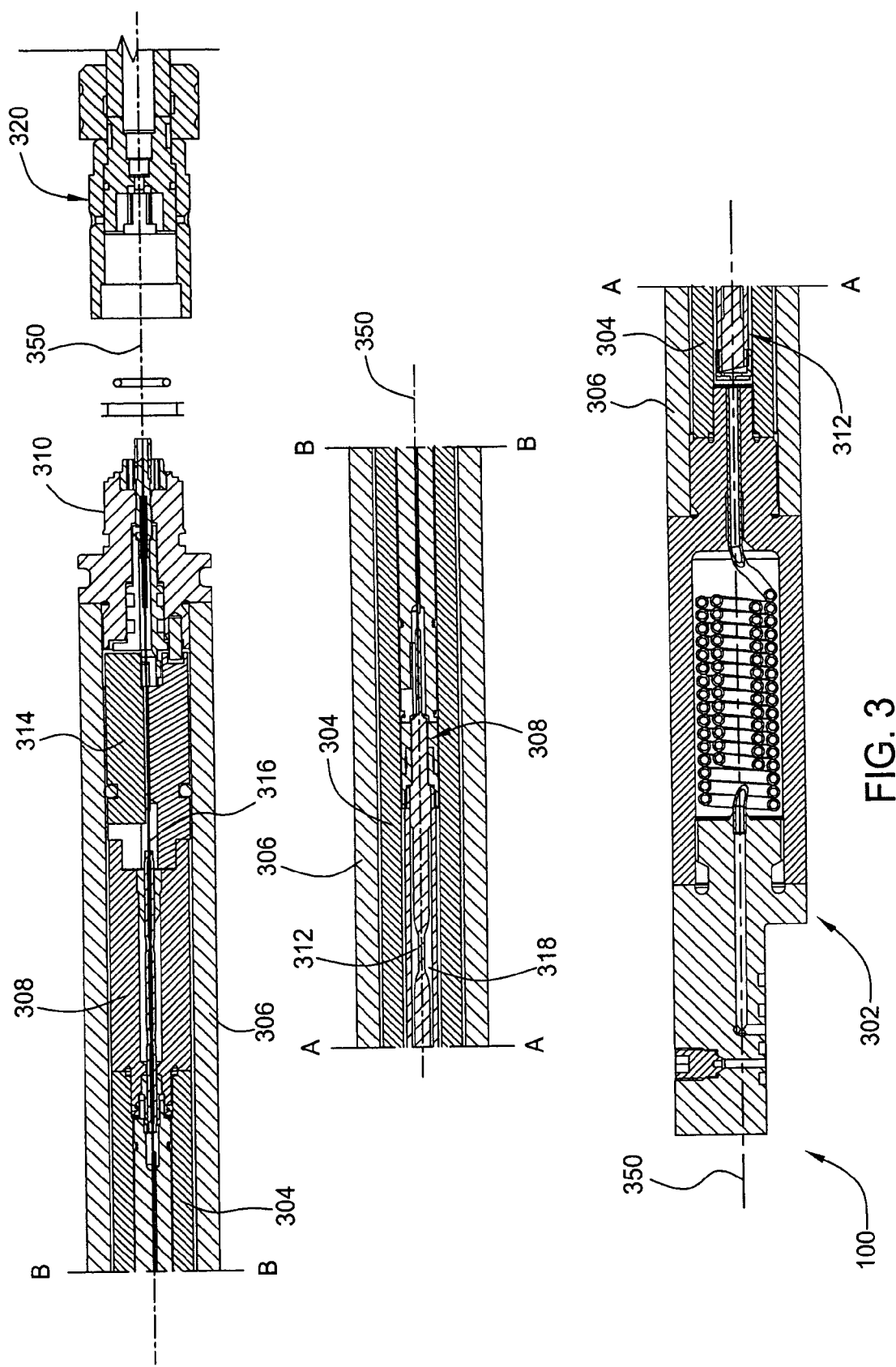
FIG. 3 is a sectional view of one embodiment of the sensor of FIG. 1 broken into sections along lines A—A and B—B.

FIG. 3 is a sectional view of one embodiment of the sensor 100. The sensor 100 includes a pressure transmitter assembly 302, an inner and outer shell 304, 306, a transducer assembly 308 and a connector assembly 310. The inner shell 304 is sealingly coupled to the transmitter assembly 302 and the transducer assembly 308, defining a sensing chamber 312. The outer shell 306 is sealing coupled to the transmitter assembly 302 and the connector assembly 310 to provide a protective barrier over the transducer assembly 308. A strain relief 314 is disposed within the outer shell 306 between the transducer assembly 308 and the connector assembly 302 to ensure an optical lead 316 maintains reliable connection between the transducer assembly 308 and the connector assembly 302.

The shells 304, 306 may be fabricated from INCONEL® stainless steel or other suitable material. In the embodiment depicted in FIG. 3, the shells 304, 306 are hollow tubes.

The sensing chamber 312 includes a buffer fluid 318 that is configured to be maintained in a predefined relationship to a pressure of bore fluid 210 disposed in the well bore. The transmitter assembly 302 is configured to transmit pressure information between the bore fluid 210 and the buffer fluid 318.

Figure 4B:
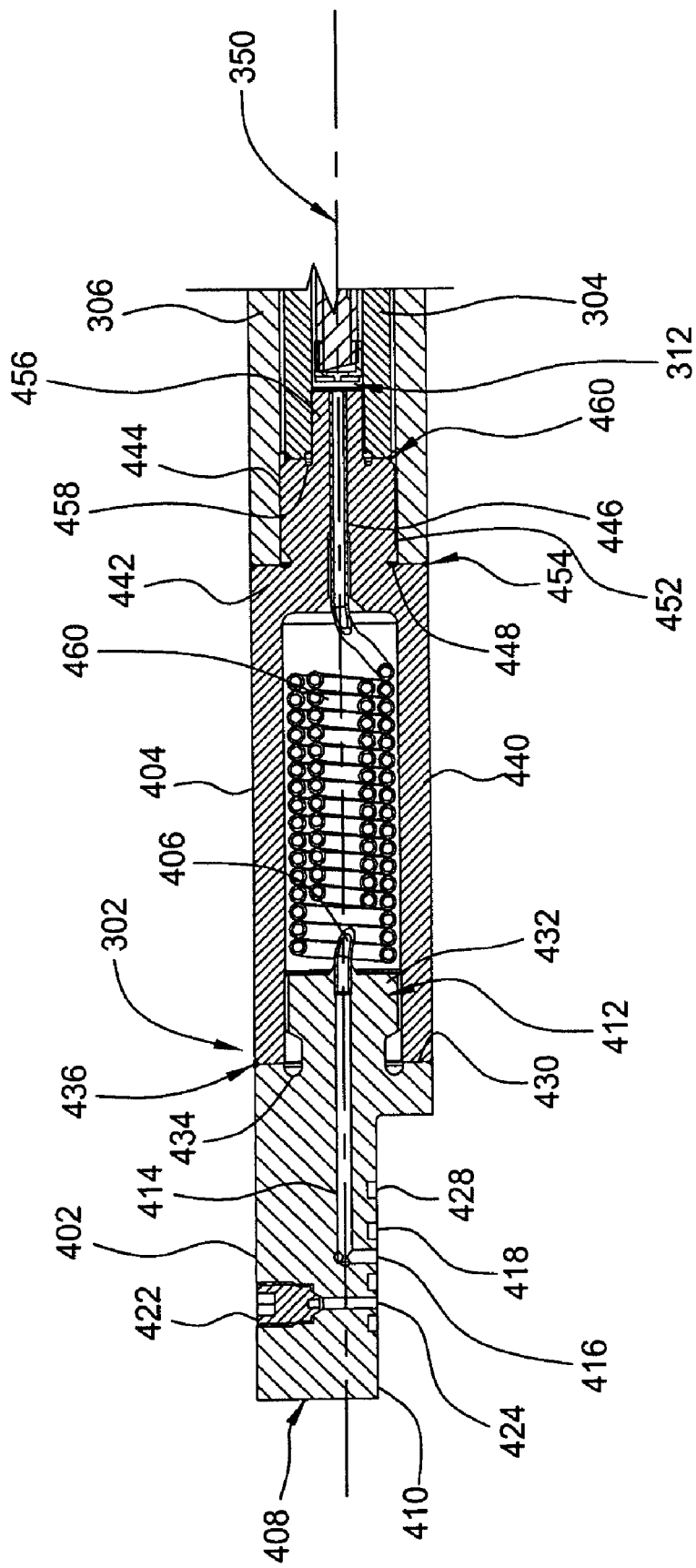

FIGS. 4A–B are side and sectional views of the transmitter assembly 302 of FIG. 3. The transmitter assembly 302 includes a mounting portion 402, a housing 404, and a buffer tube 406. The mounting portion 402 includes a first end 408 having a mounting face 410 formed therein, and a second end 412 sealingly coupled to the housing 404. In one embodiment, the mounting face 410 is a planar surface having an orientation parallel to an axis 350 of the sensor 100.

Referring additionally to the sectional views of the mounting sections depicted in FIGS. 5–7, a pressure passage 414 is formed through the mounting portion 402, fluidly coupling the mounting face 410 to the second end 412. The pressure passage 414 generally exits the mounting face 410 at a first port 416 which is circumscribed by an o-ring groove 418 to allow the first port 416 to be sealed against the mandrel 112 by an o-ring 420 upon installation to allow bore fluids 210 to enter the pressure passage 414.

The mounting portion 402 is generally secured to the mandrel 112 by a plurality of fasteners 702 disposed through holes 704 formed through the first end 408 of the mounting portion 402 and threaded into holes (not shown) formed in the mandrel 112. The mounting portion 402 may be secured to the mandrel 112 by alternative methods suitable for use in down-hole well applications, for example, clamping, banding, welding and the like.

The mounting portion 402 additionally includes a test port 422 coupled through the first end 408 to a second port 424 formed in the mounting face 410. The test port 422 is generally sealed to the mandrel 112 between the o-ring 420 and an o-ring 426 disposed in a groove 428. The o-ring 420 fluidly isolates the first and second ports 416, 424 during operation of the sensor 100.

Figure 8:
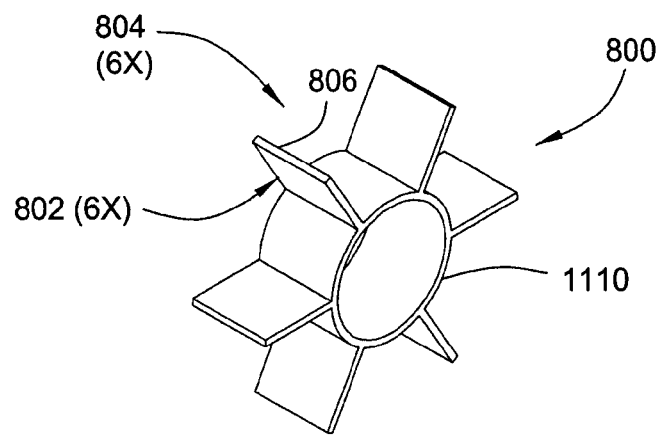
FIG. 8 is an isometric view of one embodiment of a test fixture.

The test port 422 is configured to accept a high pressure fitting (not shown) that allows coupling the test port 422 to a pressurization device (also not shown) for field or bench testing of the sensor 100. The adjacent configuration of the first and second ports 416, 424 allows fluid communication to be established therebetween by a test fixture 802 (shown in FIG. 8) coupled over the mounting face 410. The fixture 802 includes a flat surface 804 for sealing against the face 410 and a "U-shaped" passage 806 formed in the plate 802. The passage 806 couples the ports 808, 810 formed on the surface 804 thereby coupling the ports 416, 424 across the o-ring 420. A pressure generating device (not shown) may be coupled to the test port 422 to the pressure passage 414 is formed through the mounting portion 402, fluidly to the second end 412. The test port 422 may be sealed by a plug 602 when not in use.

The second end 412 of the mounting portion 402 includes face 430 having a boss 432 extending coaxially to the center axis 350 away from the first end 408. The intersection between the face 430 and boss 432 includes a relief 434 to facilitate a continuous sealing weld 436 of a cylindrical wall 440 the housing 404 to the face 430. In one embodiment, the weld 436 is an electron beam weld, and in another embodiment, the weld 436 fully penetrates the cylindrical wall 440 to face 430 joint to ensure reliable sealing therebetween.

Referring primarily to FIG. 4B, the housing 404 includes a center section 442 having the cylindrical wall 440 and a stepped boss 444 extending therefrom in opposite directions. The center section 442 includes a chamber passage 446 that extends through the stepped boss 444. The intersection between the center section 442 and a larger diameter portion 452 of the boss 444 includes a relief 448 to facilitate a continuous sealing weld 454 of the outer shell 306 to the housing 404. In one embodiment, the weld 454 is an electron beam weld, and in another embodiment, the weld 454 fully penetrates the outer shell 306 to the housing 404 joint to ensure reliable sealing therebetween.

The intersection between the larger diameter portion 452 and a reduced diameter portion 456 of the stepped boss 444 includes a relief 458 to facilitate a continuous sealing weld 460 of the inner shell 304 to the housing 404. In one embodiment, the weld 460 is an electron beam weld, and in another embodiment, the weld 460 fully penetrates the inner shell 304 to the housing 404 joint to ensure reliable sealing therebetween.

The buffer tube 406 is disposed in a buffer chamber 462 defined by the cylindrical wall 440 of the housing 404 and the end of the boss 432 of the mounting portion 402. The buffer tube 406 is coupled at a first end to the pressure passage 414 of the mounting portion 402 and coupled at a second end to the chamber passage 446 extending through the housing 404. The buffer tube 406 may be sealingly secured to the pressure passage 414 and the chamber passage 446 by brazing, epoxy, welding or other methods for creating a pressure tight joint.

At least the portion of the buffer tube 406 extending from the chamber passage 446 is filled with the buffer fluid 318. Optionally, the buffer tube 406 and pressure passage 414 may be initially filled with the buffer fluid 318 to ensure an adequate volume of buffer tube 406 within the sensor 100 once the sensor 100 is subjected to high pressures, reduce entry of contaminants into the buffer tube 406 and passages 414, 446, and to ensure gases are not entrained with the fluid path prior to installation which may reduce pressure sensing accuracy and repeatability.

Figure 9:
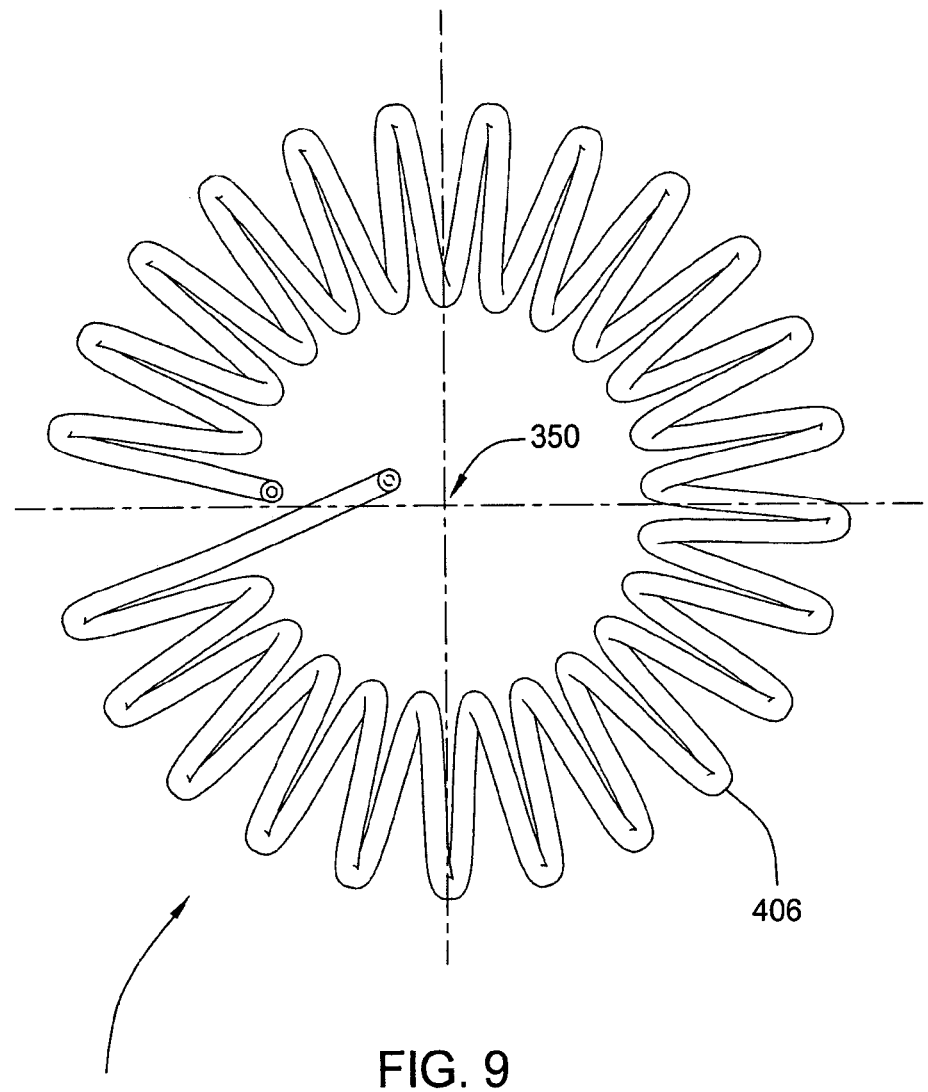
FIG. 9 is an alternative embodiment of a buffer tube.

The buffer tube 406 functions to isolate the transducer assembly 308 from the bore fluid 210. To enhance the isolation of the bore fluid 210 from the sensing chamber 312, the buffer tube 406 may be coiled within the buffer chamber 462 to increase the distance of the fluid path between the pressure port 416 and sensing chamber 312. In the embodiment depicted in FIG. 4B, the buffer tube 406 is configured in a plurality of rows of coils (an inner row 468A is shown circumscribed by an outer row 468B). The rows 468A–B may be concentric. Other configurations for maximizing the length of the buffer tube 406 within the buffer chamber 462 are also contemplated. For example as depicted in FIG. 9, the buffer tube 406 may be in the form of a toroidal coil 902.

FIG. 10 is a sectional view of one embodiment of the transducer assembly 308. The transducer assembly 308 includes a sensing assembly 1004, a spacer 1002 and a sensor assembly end cap 1008. The sensing assembly 1004 is coupled to the spacer 1002 by a bushing 1010. The spacer 1002 is disposed between the sensing assembly 1004 and the end cap 1008. The spacer 1002 and the sensing assembly 1004 are disposed inside the inner shell 304, which is sealingly welded to the end cap 1008 to seal the end of the sensing chamber 312 opposite the transmitter assembly 302. The inner and outer shells 304, 306 advantageously protect the transmitter assembly 302 by insuring that a catastrophic well failure of the sensor 100 would not occur in the event that a weld failure occurs at one of the shells. Borehole fluid would then be contained by at least one of the shells, thus preventing a path to the sensing element 1102.

Figure 11:
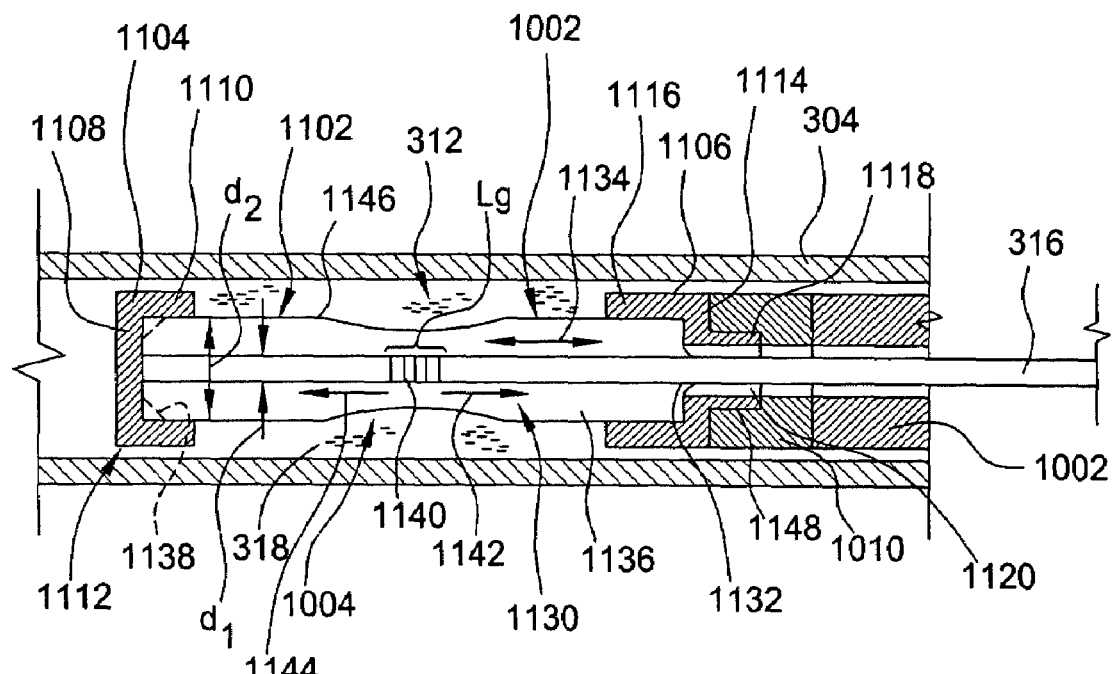
FIG. 11 is one embodiment of a sensing assembly.

FIG. 11 depicts one embodiment of the sensing assembly 1004. The sensing assembly 1004 includes a sensing element 1102 and guards 1104, 1106. The 316 lead couples the sensing element 1102 to the connector assembly 310.

The sensing element 1102 includes a large diameter optical waveguide 1130, has at least one core 1132 surrounded by a cladding 1136, similar to that disclosed in U.S. Pat. No. 6,363,089, entitled "Large Diameter Optical Waveguide, Grating, and Laser", which is incorporated herein by reference. The waveguide 1130 comprises silica glass ($SiO_2$) based material having the appropriate dopants, as is known, to allow light 1134 to propagate in either direction along the core 1132 and/or within the waveguide 1130. The core 1132 has an outer dimension d1 and the waveguide 1130 has an outer dimension d2. Other materials for the optical waveguide 1130 may be used if desired. For example, the waveguide 1130 may be made of any glass, e.g., silica, phosphate glass, or other glasses; or solely plastic.

In one embodiment, the outer dimension d2 of the cladding 1136 is at least about 0.3 mm and outer dimension d1 of the core 1132 such that it propagates only a few spatial modes (e.g., less than about 6). For example for single spatial mode propagation, the core 1132 has a substantially circular transverse cross-sectional shape with a diameter d1 less than about 12.5 microns, depending on the wavelength of light. The invention will also work with larger or non-circular cores that propagate a few (less than about 6) spatial modes, in one or more transverse directions. The outer diameter d2 of the cladding 1136 and the length L have values that will resist buckling in the event the waveguide 1130 is placed in axial compression.

The waveguide 1130 may be ground or etched to provide tapered (or beveled or angled) outer edges or corners 1138 (shown in phantom) to provide a seat for the waveguide 1130 to mate with the guides 1104, 1106 and/or to adjust the force angles on the waveguide 1130, or for other reasons. The angle of the beveled corners 1138 is set to achieve the desired function. Further, the waveguide 130 may be etched or ground to provide nubs for a attachment of the lead 316 to the waveguide 1130. The lead 316 may be fabricated as an extension of the core 1132. Further, the size of the waveguide 1130 has inherent mechanical rigidity that improves packaging options and reduces bend losses.

The waveguide 1130 has a Bragg grating 1140 impressed (or embedded or imprinted) therein. The Bragg grating 1140, as is known, is a periodic or aperiodic variation in the effective refractive index and/or effective optical absorption coefficient of an optical waveguide. The grating 1140 may be in the core 1132 and/or in the cladding 1136 (shown in the core 1132 in FIG. 11). Any wavelength-tunable grating or reflective element embedded, etched, imprinted, or otherwise formed in the waveguide 1130 may be used if desired. The waveguide 1130 may be photosensitive if a grating 1140 are to be written into the waveguide 1130. As used herein, the term "grating" means any of such reflective elements. Further, the reflective element (or grating) 1140 may be used in reflection and/or transmission of light. Light 1134 incident on the grating 1140 reflects a portion thereof as indicated by a line 1142 having a predetermined wavelength band of light, and passes the remaining wavelengths of the incident light 1134 (within a predetermined wavelength range), as indicated by a line 1144 (as is known).

The grating 1140 has a grating length Lg, which is determined based on the application, may be any desired length. A typical grating 1140 has a grating length Lg in the range of about 3–40 mm. Other sizes or ranges may be used if desired. The length Lg of the grating 1140 may be shorter than or substantially the same length as the length L of the waveguide 1130. Also, the core 1132 need not be located in the center of the waveguide 1130 but may be located anywhere in the waveguide 1130.

Accordingly, the present invention also reduces coupling between the core and cladding modes due to the increased end cross-sectional area between the core and cladding of the waveguide. Thus, a grating 1140 written in the core 1132 of the waveguide 1130 exhibits less optical transmission loss and exhibits a cleaner optical profile than a conventional fiber grating because the large cladding region dissipates coupled cladding modes, thereby reducing the coupling of the core 1132 to the cladding 1136 modes. In general, the greater the difference in cross-sectional area between the core 1132 and the cladding 1136 the smaller the mode field overlap and the lower the coupling to the cladding modes. The thickness of the cladding 1136 between the cladding outer diameter and the core outer diameter may be set to optimize this effect. Other diameters of the core 1132 and waveguide 1130 may be used if desired such that the cladding modes are reduced to the desired levels.

The waveguide 1130 may have end cross-sectional shapes other than circular, such as square, rectangular, elliptical, clam-shell, octagonal, multi-sided, or any other desired shapes, discussed more hereinafter. Also, the waveguide may resemble a short "block" type or a longer "cane" type geometry, depending on the length of the waveguide and outer dimension of the waveguide.

The side cross-section of the outer surface of the waveguide 1130 may have a varying geometry, depending on the application. For example, the waveguide 1130 may have a "dogbone" shape having a narrow central section and larger outer sections. The dogbone shape may be used to provide increased sensitivity in converting axial force to length change ΔL and/or wavelength shift Δλ of the grating 1140 and may be achieved by etching, grinding, machining, heating & stretching, or other known techniques.

The dimensions and geometries for any of the embodiments described herein are merely for illustrative purposes and, as such, any other dimensions may be used if desired, depending on the application, size, performance, manufacturing requirements, or other factors, in view of the teachings herein.

The optical waveguide 1130 may be formed by heating, collapsing and fusing a glass capillary tube to a fiber (not shown) by a laser, filament, flame, etc., as is described U.S. Pat. No. 6,519,388, entitled "Tube-Encased Fiber Grating", which is incorporated herein by reference. Alternatively, other techniques may be used to fuse the fiber to the tube, such as using a high temperature glass solder, e.g., a silica solder (powder or solid), such that the fiber, the tube and the solder all become fused to each other, or using laser welding/fusing or other fusing techniques.

The Bragg grating may be written in the fiber before or after the capillary tube is encased around and fused to the fiber, such as is discussed in the above referenced U.S. Pat. No. 6,519,388. If the grating is written in the fiber after the tube is encased around the grating, the grating may be written through the tube into the fiber by any desired technique, such as is described in U.S. Pat. No. 6,298,184, entitled "Method and Apparatus For Forming A Tube-Encased Bragg Grating", filed Dec. 4, 1998, which is incorporated herein by reference.

In the embodiment depicted in FIG. 11, the sensing element 1102 includes a fluid diffusion resistant coating 1146. The coating 1146 prevents diffusion of fluids, such as water, into the sensing element 1102, which may adversely effect sensor performance. The coating 1146 may be, but is not limited to, one or more layers of material selected from the group consisting of chrome, gold, silver, carbon, and silicon oxide, among other materials suitable for preventing water diffusion into a glass-based sensing element. The coating 1146 may optionally be comprised of one or more layers of different materials. One sensing element having a fluid diffusion resistant coating that may be adapted to benefit from the invention is described in U.S. Pat. No. 6,626,043, issued Sep. 30, 2003, to Bailey et al., which is hereby incorporated by reference in its entirety.

The sensing element 1102 is protected from impacting the inner shell 304 by the guards 1104, 1106. The first guard 1104 is disposed on the distal end of the sensing element 1120. The first guard 1104 includes a base 1108 having a cylindrical wall 1110 extending therefrom. The cylindrical wall 1110 is configured to snugly fit over the sensing element 1102. Alternatively, the cylindrical wall 1110 may be adhered or otherwise affixed to the sensing element 1102. The outer diameter of the cylindrical wall 1110 is slightly less than the inner diameter of the inner shell 304, thereby allowing the buffer fluid 310 to freely pass around the guard 1104 through a wide range of temperatures. In one embodiment, the first guard 1104 fabricated from a high temperature plastic suitable for use in oil well environments, such as VESPEL®.

The second guard 1106 is disposed on the end of the sensing element 1120 closest the connector assembly 310. The second guard 1106 is configured similar to the first guard 1104 and includes a base 1114 having a cylindrical wall 1116 extending therefrom. The base 1114 of the second guard 1106 includes a boss 1118 extending axially opposite the cylindrical wall 1116. The boss 1118 and base 1114 include a fiber passage 1120 formed therethrough that allows the lead 316 to pass from the sensing element 1102 to the connector assembly 302 (not shown in FIG. 11).

A recess 1148 formed in the bushing 1010 accepts the boss 1118 of the second guard 1106. The bushing 1010 may be fabricated from any suitable material. Alternatively, the bushing 1010 may be part of the spacer 1002 as a single structure. The second guard 1106 is coupled to the bushing 1010 in a manner that prevents rotation of the sensing element 1102 held by the second guard 1106. In one embodiment, the boss 1118 of the second guard 1106 may be adhered, bonded, staked, pinned, clamped, force fit or affixed by other means that prevent rotation in the recess 1148 of the bushing 1010.

Figure 12:
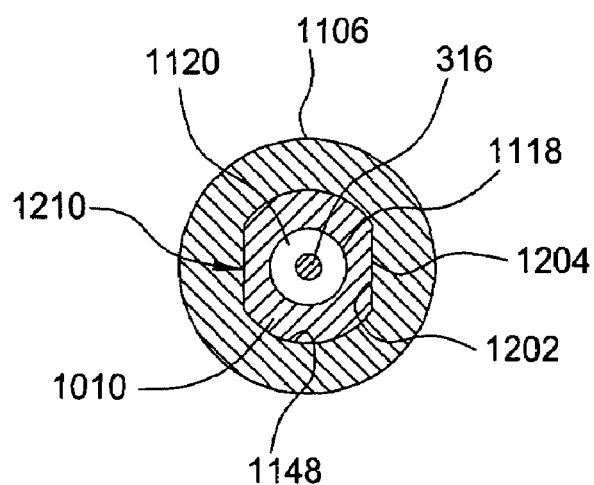
FIG. 12 is one embodiment of a guard and boss of the sensing assembly taken along section line 12—12 of FIG. 11.

FIG. 12 is a sectional view of the bushing 1010 and the second guard 1106 taken along section line 12—12 of FIG. 11. In the embodiment depicted in FIG. 12, the bushing 1010 and second guard 1106 includes at least one mating feature 1210 that is adapted to fix the rotational orientation of the second guard 1106 and the bushing 1010. For example, recess 1148 of the bushing 1010 may include a flat 1202 that interfaces with a flat 1204 formed on the boss 1118 of the second guard 1106 to prevent rotational movement. It is contemplated that other geometry, including additional structures such as keys, may be utilized to provide a mating engagement between the second guard 1106 and the bushing 1010 to fix the orientation therebetween.

Returning to FIG. 11, the bushing 1010 and spacer 1002 support the sensing element 1102 in a cantilevered orientation within the sensing chamber 312. As the sensing element 1102 held is spaced from the inner shell 304, the sensing element 1102 is protected from impact and direct shock transmission through the shell 304. Moreover, in extreme shock conditions, the guards 1104, 1106 surrounding the sensing element 1102 provide an extra level of protection against damage to the sensing element 1102 by physically preventing contact with the shell 304 while ensuring the sensing element 1102 is fully bathed in the buffer fluid 318 to enhance sensor performance.

Referring additionally to FIG. 10, the spacer 1002 is coupled to the bushing 1010 at a first end and to the sensor assembly end cap 1008 at a second end by suitable adhesives. The length and diameter of the bushing 1010 and spacer 1002 is selected to maintain a substantially coaxial orientation with the axis 350 of the sensor 350 and the inner shell 304. The spacer 1002 is generally fabricated from INCONEL® or other suitable material.

The spacer 1002 includes a central fiber passage 1020 that aligns with the fiber passage 1120 that allows the lead 316 to pass therethrough. The fiber passage 1120 of the spacer 1002 includes a first enlarged portion 1022 and a second enlarged portion 1024. The first enlarged portion 1022 of the fiber passage 1020 is configured to retain a serpentine length of the fiber optic lead 316 to allow for thermal expansion of the sensor 100 without stressing the lead 316. The second enlarged portion 1024 is configured to allow clearance between a sleeve 1006 disposed through the sensor assembly end cap 1008 and the spacer 1002.

The end of the spacer 1002 engages the sensor assembly end cap 1008 in a manner that prevents rotation therebetween. In one embodiment, the spacer 1002 and the sensor assembly end cap 1008 may be adhered together in a manner that prevents rotation therebetween. Other suitable methods for fixing the orientation between the spacer 1002 and the sensor assembly end cap 1008 are contemplated.

FIGS. 13–14 are sectional and perspective views of the spacer 1002 and the sensor assembly end cap 1008 illustrating one embodiment of a method for fixing the orientation between the spacer 1002 and the sensor assembly end cap 1008. The spacer 1002 and sensor assembly end cap 1008 include interlocking fingers 1404, 1402 that respectfully engage slots 1408, 1406 formed between the fingers 1404, 1402.

Figure 15:
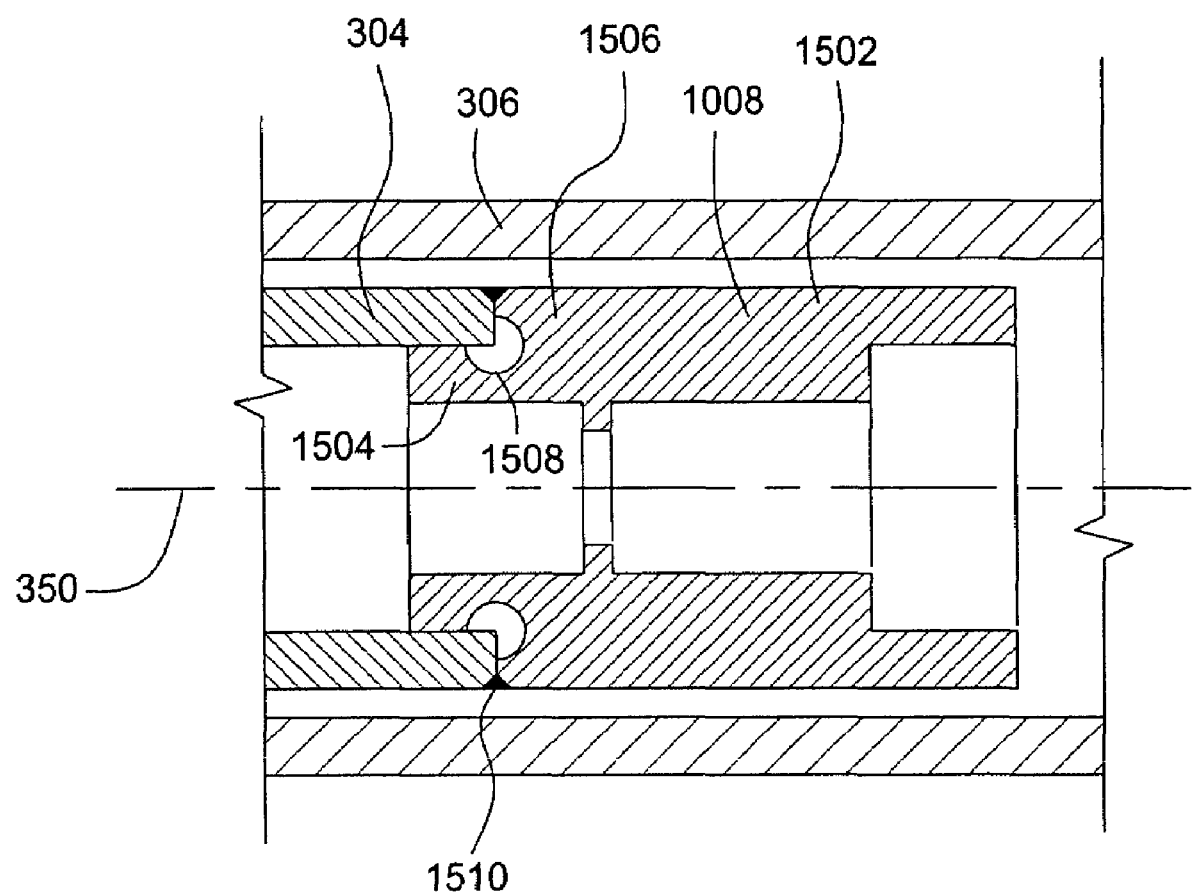
FIG. 15 is a sectional view of one embodiment of the sensor assembly end cap of FIG. 10.

FIG. 15 is a sectional view of one embodiment of the sensor assembly end cap 1008 of FIG. 10. The sensor assembly end cap 1008 may be fabricated from INCONEL® or other suitable material. The sensor assembly end cap 1008 includes a hollow outer cylindrical section 1502 having a diameter substantially equal to the diameter of the outer shell 306. An inner cylindrical section 1504 extends coaxially from a first end 1506 of the outer cylindrical section 1502. The intersection between the first end 1506 of the outer cylindrical section 1502 and the inner cylindrical section 1504 includes a relief 1508 to facilitate a continuous sealing weld 1510 of the inner shell 304 to the end cap 1008. In one embodiment, the weld 1510 is an electron beam weld, and in another embodiment, the weld 1510 fully penetrates the inner shell 304 to sensor assembly end cap 1008 to joint to ensure reliable sealing therebetween.

Figure 16:
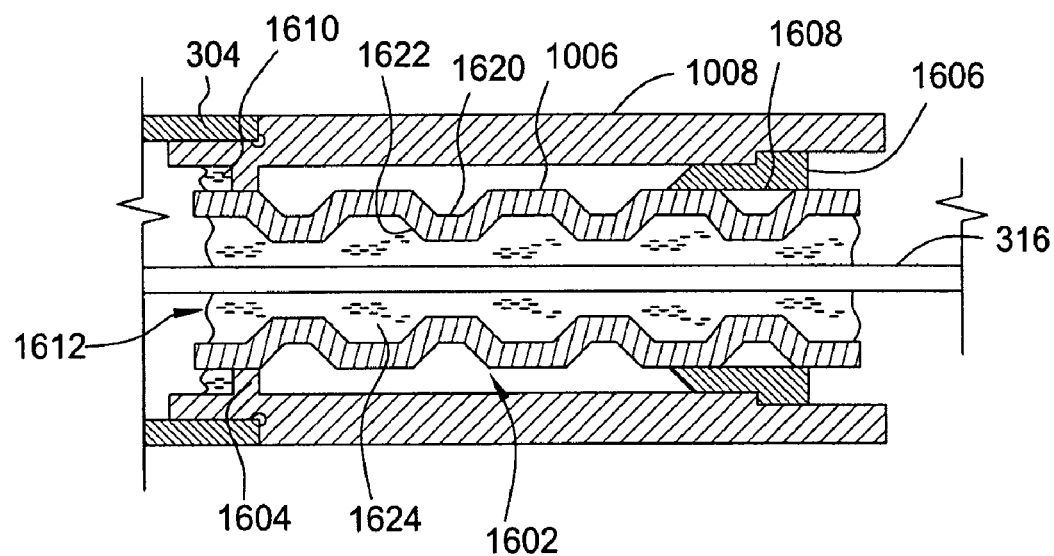
FIG. 16 depicts one embodiment of the pressure barrier formed in a sleeve of the sensor assembly end cap.

Referring additionally to FIG. 16, the sensor assembly end cap 1008 includes a passage 1602 that accommodates the sleeve 1006. A first end of the passage 1602 includes a radially inwardly extending lip 1604 that centrally holds one end of the sleeve 1006 within the passage 1602. A second end of the passage 1602 opposite the lip 1604 is configured to accommodate a bushing 1606. The bushing 1606 is force-fit or adhered to the end cap 1508. The bushing 1606 has an aperture 1608 for accommodating the sleeve 1006. The bushing 1606 and the lip 1604 are configured to concentrically align the sleeve 1006 to the axis 350 of the sensor 100.

The lip 1604 is inwardly offset from the first end of the passage 1602 to allow the sleeve 1006 to be potted or otherwise sealed to the sensor assembly end cap 1008. In one embodiment, the sleeve 1006 is sealed to the sensor assembly end cap 1008 by any suitable adhesive, epoxy potting compound 1610 or other type.

Pressure within the sensing chamber 312 is prevented from passing the sensor assembly end cap 1008 by the weld 1510, the potted sleeve 1006 and at least one pressure barrier 1612 formed between the optical lead 316 and sleeve 1006. In one embodiment, the pressure barrier 1612 may be a suitable adhesive disposed between the sleeve 1006 and lead 316 to prevent the buffer fluid 318 from passing out of the sensing chamber 312 through the sleeve 1006.

In the embodiment depicted in FIG. 16, the pressure barrier 1612 is a plurality of crimps 1620 formed in the sleeve 1006. The crimps 1620 are not deep enough to clamp the fiber lead 316, but rather provide a series of flow restrictions 1622 (e.g., dams) that prevents adhesives 1624 disposed in the sleeve 1006 from being extruded toward the connector assembly 310, effectively sealing the optical lead 316 to the sleeve 1006.

Returning to FIG. 3, a strain relief 314 is disposed in the outer shell 306 between the transducer assembly 308 and the connector assembly 310. The strain relief 314 includes a passage 380 configured to retain a serpentine length of the fiber optic lead 316 to allow for thermal expansion of the sensor 100 without stressing the lead 316.

The strain relief 314 is generally coupled to the transducer assembly 308 by suitable adhesives. The strain relief 314 and the transducer assembly 308 may be keyed to prevent relative rotation therebetween. The strain relief 314 is generally sized to fit snugly within the outer shell 306 to hold the transducer assembly 308 prior to coupling the connector assembly 310 to the optical lead 316.

In FIG. 3, the connector assembly 310 of the sensor 100 is shown with a mating connector 322 coupled to the end of the optical cable 104. Although the connector assembly 310 is depicted as engaging mating connector 322 having a female configuration in the embodiment depicted in FIG. 3, it is contemplated that the connector assemble 310 may have a female configuration that mates with a male mating connectors at the end of the optical cable 104.

Figure 17:
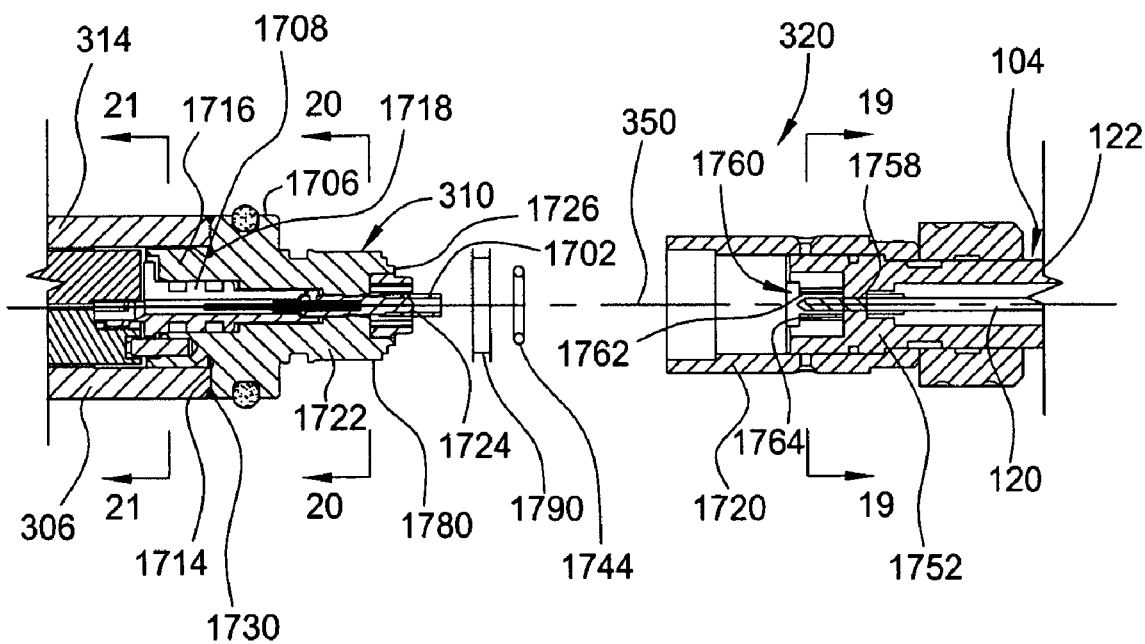
FIG. 17 is a cross-sectional view of a fiber optic connector assembly.

FIG. 17 depicts one embodiment of the connector assembly 310 and mating connector 322. The connector assembly 310 and the mating connector 322 join the end of the fiber optic cable 104 to the sensor 100. A make-up nut 1720, captured by one of the connector assembly 310 and the mating connector 322, is threaded onto the other connector 310, 322 to maintain engagement between connectors 310, 322.

Referring additionally to FIG. 18, the connector assembly 310 includes a male housing 1722 for housing a male terminus 1724 of the optical lead 316. The male terminus 1724 is protected by a sleeve 1702 that extends beyond an outer surface 1726 of the housing 1722.

The male terminus 1724 extends through a passage 1710 formed through the male housing 1722 and is coupled to the optical lead 316 as is known. The male terminus 1724 is keyed to a guide 1708. The guide 1708 is keyed to the male housing 1724. In the embodiment shown in the sectional views of FIGS. 20–21, the male terminus 1724 includes a male feature 2002 that engages a female feature 2004 formed in the guide 1708, while the guide 1708 includes a male feature 2102 that engages a female feature 2104 formed in the housing 1722 to maintains a predefined orientation between the lead 316 and components connector assembly 310.

Returning to FIG. 17, the male housing 1722 includes flange 1706. The flange 1706 has inner surface 1714 opposite the outer surface 1726 of the male housing 1722. The inner surface 1714 has a boss 1716 extending therefrom. The boss 1716 is configured to fit within the inner diameter of the outer shell 306. The intersection between the boss 1716 and the inner surface 1714 includes a relief 1718 to facilitate a continuous sealing weld 1730 of inner surface 1714 of the male housing 1722 to the outer shell 306. In one embodiment, the weld 1730 is an electron beam weld, and in another embodiment, the weld 1730 fully penetrates the inner surface 1714 to outer shell 306 joint to ensure reliable sealing therebetween.

The housing 1722 includes an orientation feature 1712 that concentrically aligns and rotationally fixes the orientation between the connector 310, 322. In the embodiment depicted in FIGS. 17–18, the orientation future 1712 is incorporated into the sleeve 1702 as a pair of flanges 1728, 1730 that protrude outwardly from the surface 1726 to protect the terminus 1724 while forming first and second key openings 1732, 1734. It is contemplated that one or more orientation features having alternative configurations may be utilized.

The mating connector 322 coupled to the optical cable 104 includes a female housing 1752 having a female terminus 1758 is disposed therein. The female housing 1752 is sealingly welded to the sleeve 122 of the cable 104. The female terminus 1758 is coupled to the optical fiber 120 of the cable 104. The female terminus 1758 and housing 1752 are configured to have a predefined fixed orientation similar to that of the connector assembly 310.

The housing 1752 includes a recess 1760 sized to accept the sleeve 1702 of the male housing 1722. The female housing 1752 also includes at least one locating feature configured to mate with the locating feature 1712 of the male housing 1722. In the embodiment depicted in FIG. 17, the locating feature of the female housing 1752 is a first key protrusion 1762 and a second key protrusion 1764 that extend radially into the recess 1760. The protrusions 1762, 1764 are that are adapted to be received within the first and second key openings 1732, 1734 of the male housing 1722. The first key opening 1732 and first key protrusion 1762 are sized differently from the second key opening 1734 and the second key protrusion 1764 to ensure, a predefined alignment between the male and female connector 310, 322. The key protrusions 1762, 1764 are of sufficient length to prevent engagement of the terminus until proper angular alignment between the connectors 310, 322 is achieved.

Figure 22:
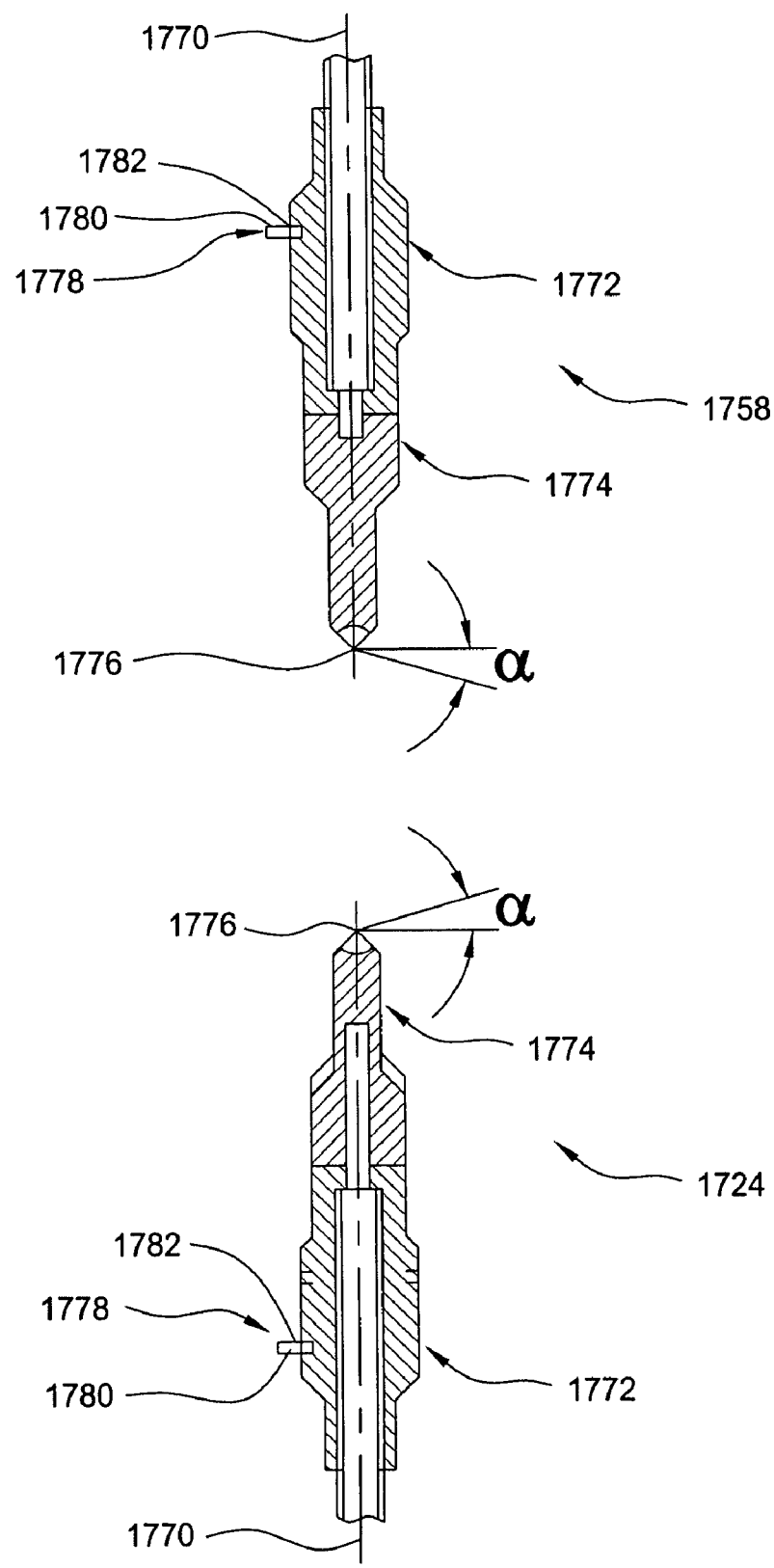
FIG. 22 is a cross-sectional, exploded view of a first terminus and a second terminus of connectors of FIGS. 17 and 21.

Referring to FIG. 22, the terminus 1724, 1758 has a central axis 1770 and includes a base part 1772 and a top part 1774. The top part 1774 terminates at a tip surface 1776. Each base part 1772 of each terminus 1724, 1758 includes a terminus key 1778. In one embodiment of the present invention, the terminus key 1778 is a pin 1780 inserted in an opening 1782 formed within the base part 1772 and protruding outwardly therefrom. The tip surface 1776 of each terminus 1724, 1758 is angled and forms an angle $\alpha$ with a line perpendicular to the axis 1770 of the terminus 1724, 1758. In one embodiment of the present invention, the angle $\alpha$ is approximately 8 degrees. The angled tip surface 1776 at each terminus 1724 is formed to mate with the corresponding terminus 1758 when both terminus 1724, 1758 are properly keyed into respective housings 1722, 1752. For higher numerical aperture fiber the angle $\alpha$ can be increased to approximately fifteen degrees.

Referring back to FIG. 17, as the two connectors 310, 322 are mated, the alignment features 1732, 1734, 1762, 1764 ensure that the two housings 1722, 1752 are properly oriented with respect to each other. For example, the housings 1722, 1752 are rotated with respect to each other until the first key protrusion 1762 and the second key protrusion 1764 fit into the first key opening 1732 and the second key opening 1734, respectively. Once the connector housings 1722, 1752 are properly aligned with respect to each other, the male terminus 1724 enters the sleeve 1768 and slides to make connection with the female terminus 1758, as best seen in FIG. 17. The second alignment features 1750, 1767, 1778 ensure that connection between the terminus 1724, 1758 is properly made. Thus, the angled tip surface 1776 of the female terminus 1758 registers with the angled tip surface 1776 of the male terminus 1724. The angled tip surface 1776 of the terminus 1724, 1758 ensures that retro-reflection is minimized.

The make-up nut 1720 is threaded onto a threaded portion 1780 of the connector assembly 310 to securely couple the male housing 1722 to the mating connector 322 in a predefined engaged and rotationally orientated position. In one embodiment of the present invention, the nut 1720 is fabricated from beryllium copper (BeCu) and, when torqued to specifications, provides sufficient elasticity to prevent back-off. As the nut 1720 urges the housings 1722, 1752 together, a metal seal 1790 is compressed between the male and female housings 1722, 1752 to provide a primary level of seal protection. An o-ring seal 1744 may be disposed between the connectors 310, 320 to provide a secondary or back-up seal, should the metal seal 1790 fail.

In one embodiment of the present invention, the terminus 1724, 1758 are a modified single channel terminus, MIL-T-29504 equivalent, which may be purchased from Packard-Hughes Interconnect Company. The terminus 1724, 1758 have a diameter of approximately two millimeters (2 mm) and have been modified to include an approximately eight degree angle on the tip surface 1776 thereof and to include the key 1778 on the base part 1772 thereof. For other embodiments, proprietary or custom termini may be utilized.

A number of features of the connector assembly 310 contribute and ensure that this connector can be used in extremely harsh environment. One such feature is the choice of high strength, corrosion resistant alloys such as Inconel 718 and beryllium copper (BeCu). Another such feature is the thickness and material from which the nut 1720 is manufactured. The elasticity of the make-up nut eliminates the need for safety wire or anti-rotation pawls once the connectors 310, 322 are coupled. One connector assembly that may be adapted to benefit from the invention is described in U.S. patent application Ser. No. 09/594,645, filed Jun. 15, 2000, which is hereby incorporated by reference in its entirety.

One major advantage of the sensor 100 is that splicing of the optical lead 316 of the sensor 100 to the cable 104 is not required, thereby reducing the complexity and risk of the connection. Another advantage of the present invention is that this sensor 100 may be tested and easily replaced at any point prior to installation within the well 110. The sensor 100 is suitable for use in downhole applications, and can operate for temperatures ranging approximately from 0 to 175 Celsius and ambient pressures of approximately one thousand (1,000) atmospheres.

The sensor 100 advantageously features a double tube protection of the sensing element 1102. The radial welds provide increased reliability over conventional fillet welds used in some prior art sensors. Moreover, the welded double tube configuration positions the sensing element 1102 behind redundant pressure barriers (e.g., the tube welds) to ensure isolation of the sensing element 1102 from bore fluids.

Moreover, the cantilevered support of the sensing element 1102 advantageously allows full contact with the pressure transmitting fluid (buffer fluid 318) while avoiding contact with the housing. Guides coupled to the sensing element 1102 additionally provide an extra level of protection against damage to the sensing element 1102 due to shock.

Furthermore, the buffer tube 406 provides isolation of the sensing element 1102 from bore fluids. As the buffer tube 406 is configured to reduce the overall length of the sensor 100, both sensor 100 and mandrel 112 lengths and their corresponding costs may be reduced.

While the present invention has been illustrated and described with respect to a particular embodiment thereof, it should be appreciated by those of ordinary skill in the art, that various modifications to this invention may be made without departing from the spirit and scope of the present invention.

What is claimed is:

1. A sensor for sensing the pressure of a first fluid, comprising:
   a housing;
   an optical waveguide based sensing element disposed in the housing;
   a buffer fluid disposed in the housing and in fluid communication with the sensing element;
   a pressure transmitter assembly coupled to the housing for maintaining a predefined relationship between pressures of the first and buffer fluids;
   a connector assembly coupled to the housing, wherein the connector assembly includes a connector feature for mating with a corresponding connector feature of an optical cable; and
   an optical waveguide coupling the sensing element to the connector assembly, wherein the optical waveguide has a terminus at the connector assembly.

2. The sensor of claim 1, wherein the housing further comprises:
   an inner shell coupled to the transmitter assembly and partially defining a sensing chamber having the sensing element and at least a portion of the buffer fluid disposed therein.

3. The sensor of claim 2, wherein the inner shell is radially electron beam welded to the transmitter assembly.

4. The sensor of claim 2, wherein the housing further comprises:
   an outer shell disposed over the inner shell and coupled to the transmitter assembly and the connector assembly.

5. The sensor of claim 4, wherein the outer shell is radially electron beam welded to the transmitter assembly and the connector assembly.

6. The sensor of claim 4, wherein the sensing element is supported within the housing in a cantilevered orientation.

7. The sensor of claim 2, further comprising:
   at least one guard coupled to the sensing element and adapted to prevent the sensing element from contacting the inner shell.

8. The sensor of claim 7, wherein the guard is configured to allow buffer fluid to pass between the guard and the inner shell.

9. The sensor of claim 1, further comprising:
   a guide disposed in the housing between the sensing element and the connector assembly, wherein the guide allows a serpentine length of fiber to pass therethrough.

10. The sensor of claim 1, further comprising:
    a hollow sleeve disposed in the housing and having the optical waveguide passing therethrough;
    a plurality of crimps formed in the sleeve creating restricted diameter sections within the sleeve; and
    an adhesive disposed in the sleeve.

11. The sensor of claim 1, the pressure transmitter further comprises;
    a buffer tube having a first end fluidly coupled to a port adapted to allow the first fluid to enter the sensor and a second end disposed within the housing, the buffer tube at least partially filled with buffer fluid.

12. The sensor of claim 11, wherein the buffer tube further comprises:
    an inner row of coils and a second row of coils, wherein the second row of coils has a greater diameter than the first row of coils.

13. The sensor of claim 11, wherein the buffer tube is wound in a toroid.

14. The sensor of claim 1, wherein the sensing element further comprises a Bragg grating sensor.

15. The sensor of claim 14, wherein the Bragg grating sensor comprises a large diameter optical waveguide.

16. The sensor of claim 14, wherein the Bragg grating sensor comprises an optical fiber.

17. The sensor of claim 1, wherein the sensing element is coated with at least one layer of a water diffusion resistant material.

18. The apparatus of claim 17, wherein the diffusion resistant material is selected from the group consisting of chrome, gold, silver, carbon and silicon oxide.

19. A sensor for sensing the pressure of a first fluid, comprising:
   a housing having a sensing chamber;
   an optical waveguide based sensing element disposed in the housing and supported within the sensing chamber in a cantilevered orientation;
   a connector assembly configured to optically couple the sensing element to an optical cable disposed external of the housing without the optical cable passing through the housing;
   a buffer fluid disposed in the housing and in fluid communication with the sensing element; and
   a pressure transmitter coupled to the housing for maintaining a predefined relationship between pressures of the first and buffer fluids.

20. The sensor of claim 19, further comprising:
   at least one guard coupled to the sensing element and adapted to prevent the sensing element from contacting the housing.

21. The sensor of claim 19, wherein at least one of the guards is configured to allow buffer fluid to pass between the guard and the housing.

22. A sensor for sensing the pressure of a first fluid, comprising:
   a housing having a sensing chamber and a fluid port;
   an optical waveguide based sensing element disposed in the housing;
   a buffer fluid disposed in the housing and in fluid communication with the sensing element; and
   a buffer tube disposed in the housing coupled between the fluid port and the sensing chamber, the buffer tube at least partially filled with the buffer fluid, the buffer tube includes at least one of:
   an inner row of coils and a second row of coils, wherein the second row of coils has a greater diameter than the first row of coils; and
   toroidal coil.

23. The sensor of claim 22, further comprising:
   a connector assembly coupled to the sensing element by an optical cable.

24. A sensor for sensing the pressure of a first fluid, comprising:
   a housing;
   an optical waveguide based sensing element disposed in the housing;
   a buffer fluid disposed in the housing and in fluid communication with the sensing element;
   a pressure transmitter coupled to the housing for maintaining a predefined relationship between pressures of the first and buffer fluids;
   a connector assembly coupled to the housing;
   an optical waveguide coupling the sensing element to the connector assembly; and
   an inner shell of the housing coupled to the pressure transmitter and partially defining a sensing chamber having the sensing element and at least a portion of the buffer fluid disposed therein.

25. A sensor for sensing the pressure of a first fluid, comprising:
   a housing;
   an optical waveguide based sensing element disposed in the housing;
   a buffer fluid disposed in the housing and in fluid communication with the sensing element;
   a pressure transmitter coupled to the housing for maintaining a predefined relationship between pressures of the first and buffer fluids;
   a connector assembly coupled to the housing;
   an optical waveguide coupling the sensing element to the connector assembly;
   a hollow sleeve disposed in the housing and having the optical waveguide passing therethrough, wherein a plurality of crimps are formed in the sleeve creating restricted diameter sections within the sleeve; and
   an adhesive disposed in the sleeve.

* * * * *